United States Patent [19]

Geyer et al.

[11] Patent Number: 4,672,599
[45] Date of Patent: * Jun. 9, 1987

[54] OPTICAL DISC UNIT AND METHOD AND APPARATUS FOR WRITING AND/OR READING INFORMATION THEREON

[75] Inventors: Frederick F. Geyer, Rochester; Dennis G. Howe, Fairport, both of N.Y.

[73] Assignee: Eastman Kodak Company, Rochester, N.Y.

[*] Notice: The portion of the term of this patent subsequent to May 8, 2001 has been disclaimed.

[21] Appl. No.: 580,590

[22] Filed: Feb. 16, 1984

Related U.S. Application Data

[62] Division of Ser. No. 160,769, Jun. 18, 1980, Pat. No. 4,447,899.

[51] Int. Cl.$^4$ .......................... G11B 7/24; G11B 17/32
[52] U.S. Cl. ..................................... 369/111; 369/275; 346/137; 360/102
[58] Field of Search ................. 369/94, 111, 261, 264, 369/270, 275–276, 284–287; 360/99–102; 346/137, 135.1

[56] References Cited

U.S. PATENT DOCUMENTS

| | | | |
|---|---|---|---|
| 4,002,826 | 1/1977 | Iemenschot | 346/137 X |
| 4,038,663 | 7/1977 | Day et al. | 346/137 X |
| 4,252,327 | 2/1981 | Elliott et al. | 360/97 X |
| 4,447,899 | 5/1984 | Geyer et al. | 369/275 X |
| 4,530,082 | 7/1985 | Howe et al. | 369/111 |

Primary Examiner—Raymond F. Cardillo
Assistant Examiner—Robert A. Weinhardt
Attorney, Agent, or Firm—Warren W. Kurz

[57] ABSTRACT

An improved method of optically writing and/or reading high density information involves: (1) predeterminedly positioning a flat, uniformly thick, flexible, optical disc with respect to an axis of rotation; (2) rotating the disc on such axis at a high speed and in a predeterminedly spaced relation to a predeterminedly shaped, smooth, featureless reference surface and (3) coupling a central region between the disc and reference surface to an ambient gas source. Related apparatus and disc configurations, including embodiments having flexible disc covers, also are disclosed.

5 Claims, 9 Drawing Figures

OPTICAL DISC UNIT AND METHOD AND APPARATUS FOR WRITING AND/OR READING INFORMATION THEREON

This is a division of application Ser. No. 160,769, filed June 18, 1980, now U.S. Pat. No. 4,447,899.

BACKGROUND OF THE INVENTION

1. Field of the Invention

The present invention relates to the optical recording and/or playback of high density information and more particularly to improved methods, media and apparatus for implementing such recording and/or playback in a flexible disc format.

2. Background of the Invention

The currently preferred optical disc technology employs disc elements with spiral or concentric tracks of minute (usually on the order of a micron or less in size), optically-detectable marks. One real-time mode of recording (writing) such marks is by scanning tracks on the disc with an equivalently small beam of radiation (e.g., from a laser) which is modulated "off or on" according to an electrical signal representative of the information to be written. Information is recovered (read) by scanning the tracks with a larger, but still very tightly focused light spot. The recovered information is in the form of a fluctuating electrical signal obtained from a photodetector that senses the read-out light reflected from the recorded disc.

In order to write and read information in the form of such minute markings, optical systems of high numerical aperture are used to focus light to equivalently minute spots. Such optical systems have extremely small depths of focus and the proper positional relation between the writing or reading optical system and the optical disc surface must be stringently maintained. One approach has been to utilize highly-precise turntables for supporting and rotating the optical discs in a predetermined plane. Such apparatus is expensive, but even with such costly turntables it is usually necessary also to provide complex focus-servo devices which effect lens adjustment in response to minute variations in the position of the surface of the optical disc relative to the lens. Such variations are caused by thickness variations and non-flatness of the disc or turntable surface or apparatus vibrations. Since the discs rotate at high speeds (e.g., 1800 RPM), these focus-servo devices must respond at very high frequencies (e.g., 500 Hz. for discs with ground glass substrates and in the range of 1000 to 3000 Hz. for discs with molded plastic substrates). Therefore these focus-servo devices are also costly, and fragile.

The costs and care of such sophisticated writing and reading apparatus have not presented insurmountable problems for some industrial or laboratory applications, but do present significant obstacles for consumer and business systems applications. Therefore, an alternative has been suggested whereby master discs, formed with the sophisticated apparatus described above, will be used to form replicate discs on flexible substrates, such replicate discs being intended for playback only. It is suggested that such flexible discs be air-supported during rotation in a manner similar to that previously used for magnetic discs. That is, it had been known previously that a "floppy" disc, comprising a magnetic layer on a readily-flexible, plastic support, could be rotated in a generally stable condition by providing an opposing stationary reference surface and supplying a throttled air flow between the disc and reference surface from a location near the rotational center to the disc periphery (see, e.g., U.S. Pat. No. 3,208,056).

The approach described in the above noted patent relied on the rotating disc achieving a balance of dynamic, fluid, gravitational and elastic forces so as to generally stabilize in some equilibrium range when rotated at a fixed speed. In accordance with the teachings of that patent, fluid forces were regulated (by controlling the air flow between the disc and stabilizing reference surface) to selectively position the disc relative to magnetic transducers embedded in the stabilizing reference surface. This allowed compensation for the differences in different discs' equilibrium positions or changes in ambient fluid conditions. It is significant to note that the aim for this magnetic write-read application was to provide a disc to transducer spacing of 0.001" or less and that the stabilizing reference surface included cavities as well as the embedded transducer heads. In a subsequent patent (U.S. Pat. No. 3,191,179) of the same assignee it was pointed out that there still existed instability problems in devices of the kind disclosed in U.S. Pat. No. 3,208,056. It was suggested that electrostatic forces be used to remedy such problems.

Subsequent development of this aerodynamic stabilization approach (see U.S. Pat. No. 3,178,719 of the same assignee) led to the implementation of what was termed a "regulated mode" of operation. In accordance with the regulated mode, the rotating disc was generally stabilized as described in U.S. Pat. No. 3,208,056 and then locally regulated or constrained toward the magnetic heads, e.g., by a localized vacuum proximate the head.

In prior art attempts to adapt the magnetic disc aerodynamic stabilization for the reading of optical discs, the regulated mode approach has been pursued. More specifically, although there has been disclosed various embodiments of optical disc reading apparatus which utilize a stationary reference, a rotating flexible disc and an air flow therebetween, all such embodiments additionally utilize some localized regulating means at the optical detection site to constrain the disc into a precise focused position relative to the optical system. Typical examples can be seen in French Pat. No. 2,167,258 (wherein a dihedral-shaped reference surface and localized stabilization plates effect such constraint) and in U.S. Pat. No. 3,947,888 (wherein a negative pressure differential in the vicinity of the reading head constrains the disc into a predetermined head-to-disc spacing). An interesting commentary on the problems which have existed is in "The Aerodynamic Stabilization of Video Discs", *IEEE Transactions on Consumer Electronics*, Vol. CL-21, No. 2, May 1975, wherein another "regulated mode" embodiment combining aerodynamic pre-stabilization and localized constraint is disclosed.

Thus, prior art techniques for rotating flexible optical discs on an air cushion have followed the regulated mode approach with various localized disc-constraining devices. Such devices add to the cost and complexity of the apparatus. Moreover, even with such constraining devices, prior art techniques have only been suggested for use in reading (not writing) with flexible optical discs. The focus precision requirements for writing on optical discs are even more stringent than for reading such discs. For example, typical optical disc systems for reading would have depth of focus tolerances of from $\pm 3\mu$ to $\pm 7\mu$ (depending on the information storage density of the disc), whereas the corresponding systems for writing information on such discs would have tolerances of from ±0.25μ to ±1μ.

SUMMARY OF THE INVENTION

The present invention provides an alternative approach, with respect to the "regulated mode", for using flexible optical discs. More specifically it is one advantage of the present invention to facilitate use of flexible optical discs, in an aerodynamically stabilized condition, without any localized forces or structure which constrain the disc out of an equilibrium path and into some predetermined position relative to the optical system. It is a further advantage of the present invention to stabilize flexible optical discs in a manner much more precise than envisioned by the prior art, e.g. so that such discs can be either written or read, rather than only read. Related advantages of the present invention are to provide improved apparatus and disc configurations which facilitate such an improved mode of operation.

In another aspect, it is an advantage of the present invention to provide improved flexible cover sheet constructions for optical discs.

In general, these objectives are accomplished in accordance with the present invention by (1) rotating a flexible, substantially-flat optical disc, having a substantially-uniform thickness, about an axis normal to the disc's central surface with the disc in opposed relation to a substantially-smooth stabilizing surface which is axially symmetric about the axis and generally non-convex with respect to the plane of the disc's central surface and (2) coupling a radially central region of the zone between the disc and reference surface to a gas source of pressure not substantially exceeding ambient pressure. It is preferred that the rotational speed of the disc and the spacing of the reference surface from the disc be such that no portion of the reference surface is closer than 0.001" to the disc and that the distance between the disc periphery and the opposing reference surface portion does not allow excessive turbulence at disc periphery. While rotating in such a stabilized condition, a tightly focused light beam is modulated to write information along tracks of the disc or scanned along recorded tracks to read recorded information on the disc. It is highly preferred in accordance with the present invention, that the optical system not constrain, or otherwise interfere to any substantial extent, with the equilibrium path of the rotating disc. In one preferred mode, the optical system is adjusted by a "gross" control system in accordance with the radial profile of the stabilized disc.

In accordance with further aspects of the present invention, improved apparatus and flexible optical disc configurations and combinations are provided for implementing the above-described methods. The apparatus is characterized by means for supporting and rotating such a flexible optical disc in the manner described above, reference surface means for cooperating with such rotating disc in the manner described above, means for coupling a radially central region between a supported disc and the reference surface means to a gas source of pressure not substantially exceeding ambient pressure and means for optically writing and/or reading information upon such a supported, rotating disc. The improved flexible, optical disc is characterized as being substantially-flat, of substantially uniform thickness and as having a substantially cylindrical outer periphery.

In accordance with another aspect of the present invention, such a flexible optical disc further includes a flexible protective disc cover having a shape corresponding to the disc and having a central region that is secured in a fixed, coplanar and predeterminedly spaced relation with respect to a corresponding central region to the optical disc, such disc cover being substantially optically transparent to writing and/or reading wavelengths and non-birefrigent and having means defining a radially central air access opening to the space between the optical disc. Thus, during rotation of the optical disc such disc cover will move to a generally stabilized position out of the depth of focus of optical means focused (to write or read) upon the optical disc. During storage the cover will provide a protective surface to prevent the accumulation of dust and scratching on the surface of the optical disc. It is highly preferred that such disc cover be flat, optically homogeneous and of uniform thickness. In another aspect of the present invention, such a protective disc cover includes filter means overlying such central air access opening.

BRIEF DESCRIPTION OF THE DRAWINGS

The above and other objects and advantages of the present invention will be understood further from the subsequent description of preferred embodiments which is made with reference to the attached drawings wherein.

DETAILED DESCRIPTION OF THE PREFERRED EMBODIMENTS

Figure 1:
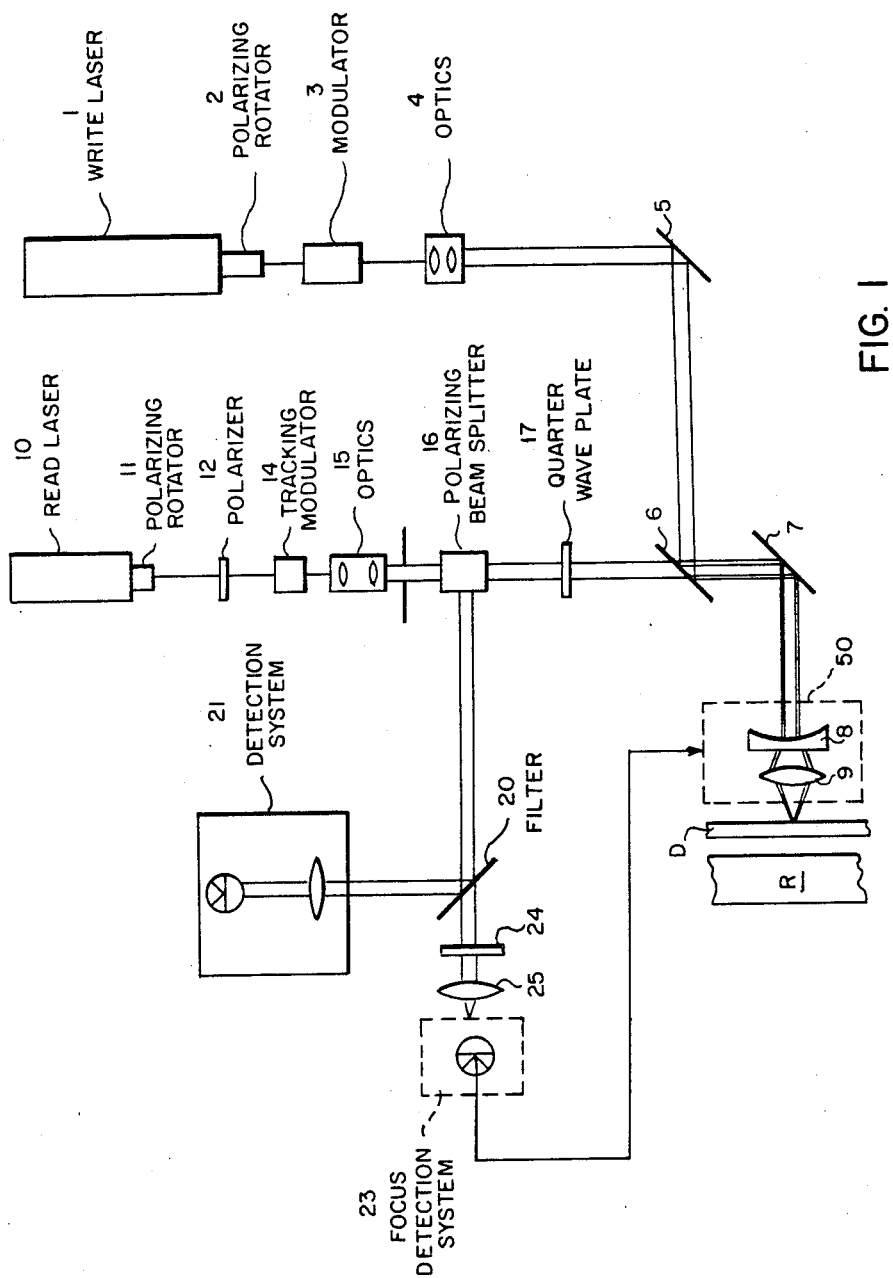
FIG. 1 is a schematic view of one embodiment of optical disc write/read apparatus with which the present invention is useful.

FIG. 1 schematically illustrates one preferred write/read apparatus wherein the present invention can be utilized with extremely good results. The writing means comprises a writing laser 1 which directs light of a first wavelength through a polarization rotator 2 to acousto-optic modulator 3 adapted to receive an electrical information signal and modulate the writing light beam in response thereto. Light exiting modulator 3 passes through afocal telescope optics 4 and is directed via mirrors 5 and 7 and beam-splitter 6 to a negative correction lens 8 and the focusing objective 9, e.g., a biological objective such as a Nikon Achromat NA 0.65 biological objective. By this optical means, light from the laser 1 can be controlled to form tracks of micron-sized pits in the rotating disc D as it moves above the stabilizing reference surface R. Preferred disc and reference surface configurations will be explained in much more detail subsequently.

The reading means shown in FIG. 1 comprises a reading laser 10 which directs light of a second wavelength sequentially through polarizing rotator 11, polarizer 12, tracking modulator 14, afocal telescope optics 15, polarizing beamsplitter 16, one-quarter wave plate 17, beamsplitter 6 and mirror 7 to elements 8 and 9. Light from the focused read spot is reflected from the disc D and returns through elements 9-6 and 17 to polarizing beamsplitter 16. The reflected read light is then directed to inconel beamsplitter 20 where it is divided and directed both to a signal detection system 21 and a focus detection system 23. The focus detection system 23 receives read light via bandpass filter 24 and a focusing lens 25. System 25 can be one of various kinds known in the art, e.g., including a Foucault knife and a split diode. The read detector system 21 similarly can take various forms known in the art. One example of such a system is disclosed in U.S. Pat. No. 4,065,786.

Figure 2:
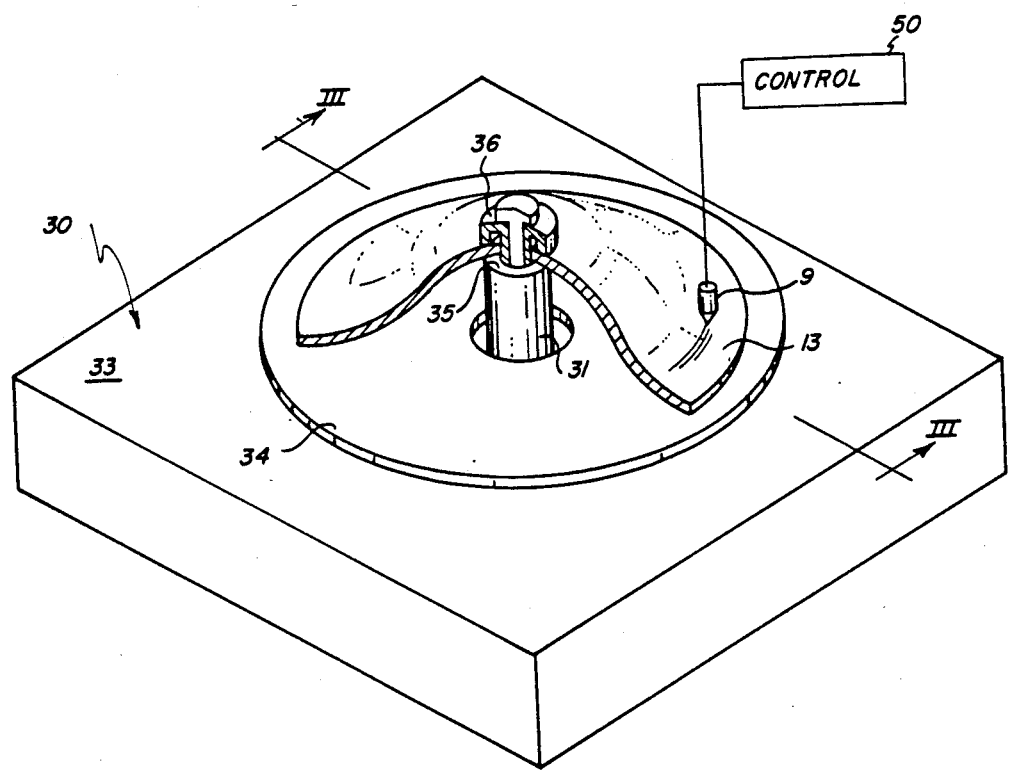
FIG. 2 is a perspective view illustrating one embodiment of apparatus and mode of the present invention.

Referring now to FIG. 2, one preferred embodiment for effecting precise stabilization of a flexible optical disc is shown. Within the write/read apparatus shown in FIG. 1, a rotatable drive shaft 31 is mounted in housing 30 with its rotational axis normal to the deck 33. Means defining a stabilizing reference surface 34 is adjustably supported on the deck 33 in concentric relation around shaft 31. The optical disc 13 is clamped by cap 36 to the top 35 of the drive shaft 31, which is located at a predetermined height above the reference surface 34.

Figure 3:
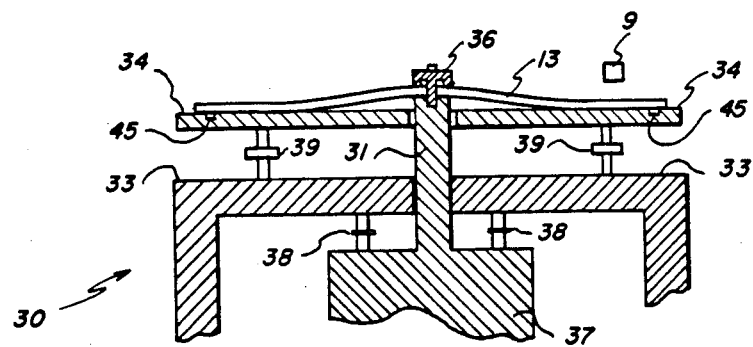
FIG. 3 is a cross-sectional view along the line III—III of FIG. 2.
Figure 4:
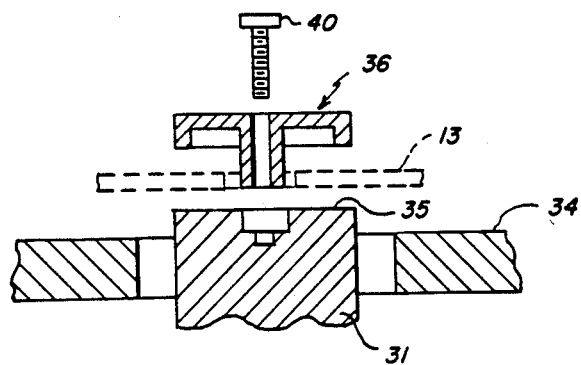
FIGS. 4 and 5 are respectively enlarged side and top views showing in more detail the relation of portions shown in FIG. 3.
Figure 5:
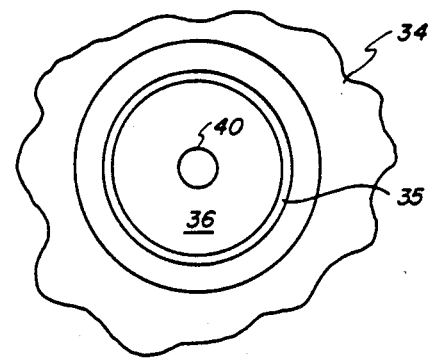

More detail of the interrelation of the FIG. 2 elements is shown in FIGS. 3-5 where it can be seen that shaft 31 is coupled to motor 37 which is adjustably supported by spider elements 38 to facilitate adjustment of the shaft axis to a condition generally normal to the deck 33, with its top surface 35 at a predetermined height above stabilizing reference surface 34. The top surface 35 is precisely machined to assure it is normal to the shaft axis of rotation. In accordance with a highly preferred mode, the disc-aligning portion of this surface has a variation of less than ±0.2 milliradians from the plane normal to the axis of rotation, when measured by rotating the shaft by hand. Adjustable elements 39 are provided to assure reference surface 34 is precisely parallel to top surface 35 and precisely normal to the axis of rotation of shaft 31.

As shown best in FIG. 4, clamp 36 has a protruding annular clamping portion and a centering portion which is adapted to fit snugly in a recess in the top of shaft 31. A precisely centered and sized aperture in disc 13 thus can cooperate with the centering portion of clamp 36 so as to precisely radially align the disc center with the axis of shaft rotation. When clamp 36 is in place in the shaft recess and secured, e.g. by a bolt 40, the annular clamping portions around its periphery secure the underlying portions of the disc in precise parallel relation to the shaft top 35 and thus the top of reference surface 34. Additionally, this peripheral clamping isolates the exterior peripheral portions of the disc 13 from any stresses created by the formation of its central aperture. It is also highly preferred that peripheries of clamp 36 and shaft 31 have a variation not exceeding 0.0001" with respect to their radial distance from this axis of rotation. This is important so that the engagement zone with the disc is axially symmetrical and will initiate uniform stresses within the disc. It also is highly preferred that the shaft have at least a predetermined minimum diameter, in relation to a given diameter disc, so that the disc is not excessively stressed, either in the radial or tangential directions during rotation. For a 12" disc rotating at 1800 RPM, we have found a shaft diameter of 1⅛" to be highly useful.

It will be noted that the central aperture in reference surface 34 exceeds the diameter of shaft 31 so as to leave an annular air passage from the atmosphere to the radially central region of the zone area between disc 13 and reference surface 34. In accord with the preferred form and mode of the present invention, this annular passage is between the 1⅛" outer diameter shaft 31 and inner diameter opening of 1¼" in reference surface 34. However, the size of this opening can vary so long as air is not so severely throttled as to cause contact between the disc and reference surface, during rotation, and the air flow into the gap is quiet (i.e., not turbulent). As shown in a preferred embodiment, the passage communicates freely with ambient atmosphere via the space beneath the reference surface and the interior of housing 30.

Figure 6:
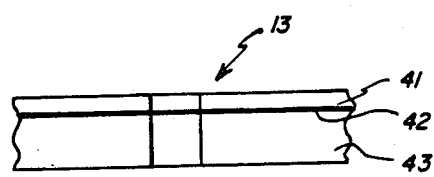
FIG. 6 is a cross-sectional view of one preferred embodiment of optical disc in accordance with the present invention.

Before proceeding to a description of how the apparatus shown in FIGS. 2-5 rotates disc 13 for writing and reading such as by the apparatus shown in FIG. 1, it is appropriate to describe features of the disc 13 itself in more detail for certain of its features are important for optimal practice of the present invention. FIG. 6 illustrates a portion of one useful disc 13 in cross-section and it can be seen to comprise a recording layer 41, a reflective layer 42 and a support 43. One preferred construction for the reflective and recording layers is disclosed in detail in U.S. application Ser. No. 124,381, entitled "Physically Optimized Optical Disc Structure, Method and Apparatus" and filed Feb. 25, 1980 in the names of Howe and Wrobel. In general, the recording layer is a real-time recordable dye-binder layer of predetermined thickness and optical constants relative to the write and read wavelengths. The reflective layer could be, e.g., a 500 Å vapor deposited aluminum layer. There are of course a wide variety of other recording layers which could be utilized in discs constructed for the present invention and in some known disc configurations the reflective layer is not required. Thus the characteristics of layers 41 and 42 are not critical in practicing the invention except insofar as they could be constructed to adversely affect the important characteristics regarding support 43 that are outlined below.

Specifically, it is important that optical discs for practice of the present invention have good flatness and thickness characteristics. It is also important and highly preferred that the disc have a smooth, substantially cylindrical periphery which is radially symmetric to its centering aperture. Moreover, we have found that in order to achieve a high degree of aerodynamic stabilization throughout a large annular portion of the disc, which is desired for optimal practice of the present invention, the flexible disc 13 preferredly should be "substantially-flat" and of "substantially-uniform-thickness." Not all commercially available support materials meet the "substantially-flat" and "substantially-uniform-thickness" criteria, therefore general tests are described for evaluating support materials according to each criterion and a preferred example of such a support material is identified below.

Herein the term "substantially-flat" as used in reference to the support, and disc itself, is intended to define the characteristic of having extremely little curl and core set. As a test for a preferred support material, a thin, e.g. 4 mil, 12" diameter disc element formed of the proposed material should be placed on a planar surface in an unconstrained condition. If such disc element exhibits any portion peripheral or central, that raises more than about 1/32" from the planar surface, it does not have the optimal characteristic of being "substantially-flat". It is highly preferred that such element have no portion that raises more than about 1/64" in such test. One preferred material which has been found to have such substantially-flat characteristic is an Estar polyethylene terephthalate film base which is extruded and biaxially oriented and commercially marketed as the photoconductor support of the Kodak Ektaprint L Image Loop. It is to be understood, however, that beneficial results can be obtained in accordance with the more general aspects of the present invention with more generally flat support materials, not meeting the above, preferred criterion. For example, good stabilization of discs over useful annular portions thereof have been attained with disc supports having peripheral curl of $\frac{1}{4}$" or even $\frac{1}{2}$".

Herein, the term "substantially-uniform-thickness" as used in reference to the disc support, and the disc itself, is intended to define the characteristic of having total thickness variation of about $\pm 2.5\mu$ or less. The Estar film support identified above also meets this defined characteristic. Again, it is to be understood that support materials of more generally uniform thickness may be useful in certain applications in accordance with the present invention. For example, where depth of focus is less critical such as in read-only applications, useful materials could have thickness variations in excess of the defined criterion.

Having described the useful and preferred disc characteristics, the preferred structure and mode for rotating the disc in a highly stabilized condition will be explained. In general, it is extremely important, for optimal practice of the invention, that the stabilizing reference surface 34 be properly configured and that the height of the top surface 35 of shaft 31 (and thus the disc's orientation plane) be properly positioned relative to reference surface 34.

More specifically, the preferred reference surface configuration has three important characteristics. First, it should be aerodynamically smooth and featureless. That characteristic of "featureless" denotes a continuous surface in distinction to prior art techniques in which grooves, apertures or sensors were incorporated in the surface. Turned and polished metal surfaces or chrome plated surfaces have been found to be preferred from the smoothness viewpoint. Second, it is preferred that the reference surface be radially symmetric with respect to the axis of rotation of shaft 31 and non-convex with respect to the plane of the shaft top 35 (i.e., the plane of disc orientation). The planar surface provided by the annular reference member 34 in the illustrated embodiment of course meets this requirement. However, it may be preferred to modify the surface configuration of reference member 34 to make it symmetrically concave, e.g., as a surface or revolution defined by a curve sloping upwardly from the central axis to the periphery. Such modifications can be useful to cause the stabilized condition of the rotating disc to be more planar in nature. In regard to symmetry, we have found it to be highly preferred that, at given radii, the reference surface have less than 1 mil (most preferably $\pm 0.5$ mil) variation in height from a plane normal to the axis of rotation of shaft 31. Finally, the periphery of the reference surface should extend at least to the periphery of the disc. That is, it should not terminate substantially radially inwardly from the disc periphery or air turbulence will occur, disrupting any effective stabilization of the rotating disc.

As mentioned above, the height of the reference surface 34 in relation to the top surface 35 of shaft 31 is also important. The preferred limits for the variation of this distance ("h" in FIG. 7) can best be described functionally in regard to the certain peripheral conditions created between the disc and reference surface during disc rotation. That is, the maximum preferred distance for height h is one which; when the disc is rotating at its nominal speed, just avoids the condition of excessive turbulence at the disc periphery. For a disc having a 0.004" thickness and a 12" diameter, rotating at 1800 RPM over a planar reference surface, such as shown in the drawings, this maximum height "h" occurs at about 0.015".

We have found the minimum for the height h to be a function of particles which are present in air and that it should in no event be less than as to maintain a peripheral air gap of about 0.001" between the disc and reference surface. Smaller peripheral gaps have two compounding adverse effects which prevent any effective stabilization. First, dust particles of 0.001" will become caught in the passage and disturb the laminar nature of the air flow. Second, even if particles are not "caught" to an extent blocking air passage, they forcefully impact the too closely opposing surfaces causing a build up of electrostatic charges. Such charges have been recognized in the art as a significant deterrent to stabilized disc flight.

Another problem creating electrostatic disturbing forces can occur during the start of disc rotation, i.e., its take-off. At this stage there is inherently a frictional rubbing between the disc and the reference surface. The extent of this effect can be lessened to some extent by reference surface configuration (e.g., making it concave) and by choice of material (i.e., a chrome-coated reference surface exhibits a good position in the triboelectric series relative to plastic supports). However, we have found it to be extremely effective to provide a quick disc take-off, e.g., preferredly effected by use of a high torque motor and relative light-weight construction of the moving parts. Alternatively peripheral lifter elements, e.g., solenoids 45 shown in FIG. 3, might be used; however, these should be precisely constructed and quickly retracted after disc take-off, to a condition leaving the reference surface featureless.

Figure 7:
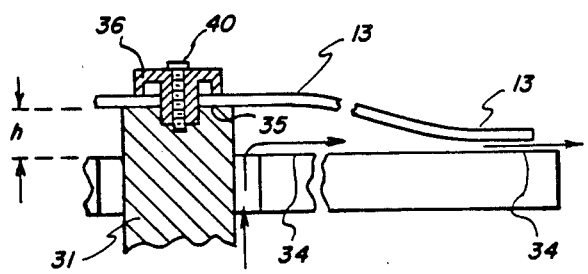
FIG. 7 is an enlarged diagrammatic side view showing the operative relation of portions of the optical disc and reference surface illustrated in FIG. 3.

Referring now to FIG. 7, one preferred mode of operation according to the present invention will be described. With the shaft 31 precisely oriented so that its surface 35 is normal to its axis of rotation, a disc 13 such as described above is precisely centered and clamped into a flying orientation defined by the plane of surface 35. The stabilizing reference surface 34 such as described above, is precisely leveled relative to the plane of surface 35 and located at a height h relative to the plane of surface 35 so as to be well within the maximal and minimal conditions outlined above. The high-torque motor is actuated to rotate shaft 31 and attached disc 13 quickly up to the desired operating speed, e.g., in less than 10 seconds. As the disc rotates over the stationary reference surface 34, dynamic forces tend to "fly" the disc, i.e., straighten it to a planar condition modified to some extent by gravitational forces and its internal elastic forces. Additionally, the air between the disc and reference surface is set into rotational motion by rotational movement of the disc surface. Due to centrifugal dynamic forces, the air flow spirals radially outwardly toward the peripheral gap between the disc and reference surface and air is drawn into the central region between the disc and reference surface through the annular space between the reference surface and shaft 31. This causes a gradient pressure to develop radially outwardly.

The nominal disc rotational rate can be selected for the signal format but should be sufficiently high so that dynamic forces straighten the disc to the modified planar condition above the reference surface. The air supply to the central region is preferredly at atmospheric pressure, but we have found that good stabilization can be obtained with slightly negative pressure sources. However, the pressure source should not be significantly positive with respect to atmospheric. Also, we have found it preferable that the air introduction means provide uniform flow along its circumference, thus the annular opening between the shaft and reference surface is preferred.

We have found that if a properly configured disc is properly supported for rotation and if this outward movement of air is highly uniform in all radial directions, a highly stabilized equilibrium condition can be attained between the dynamic, elastic, fluid and gravitational forces acting on the disc. Variations in symmetry of the radial fluid paths and discontinuities along the paths disturb the disc portion passing thereover from any stabilized condition and may even set up vibrational conditions which compound instability. Variations from the preferred disc construction and support means can cause similar disturbances. However, by operating in the completely passive mode which has been described and precisely selecting materials and configurations to conform with this mode, we have attained remarkable stabilization in vertical displacement of a large annular portion of the disc surface. Thus, using recording layers of the type disclosed in U.S. application Ser. No. 124,381, we have been able to write and read back pits having a dimension of 0.6μ (cross-track width)×1.0μ (in-track length), which were spaced center-to-center by a distance of 2.0μ along the recorded track, at high signal levels without any active focusing servo mechanism.

In certain modes, it may be desirable to provide what we term a passive focus servo system which can compensate for the very low frequency variation in disc height that occurs as writing and reading moves to different radial positions. Also such a focus servo can easily accommodate the minor variation in disc equilibrium position that exists between discs having similar, but slightly different characteristics (e.g. mass, internal elastic forces, etc.). Such a servo system is illustrated schematically as 23 and 50 in FIG. 1. It will of course be appreciated by one skilled in the art that an active focus servo can also be utilized with benefit with the present invention so long as it is not of the type which constrains movement of disc. That is, it should be moved toward and away from the disc (at a location not creating any substantial turbulence or localized pressure drop) rather than forcing or inducing movement of the disc surface to adjust focus.

The following example of one specific preferred embodiment and mode of operation will further illustrate the practice of the invention and its remarkable results. Specifically then, a 300 mm diameter disc having a support formed of 0.004 inch Estar film base of the kind described above, a surface smoothing layer, a 500 Å aluminum reflective overcoat and 1100 Å thickness dye-binder recording layer of the type described in U.S. application Ser. No. 124,381 was mounted in accordance with the present invention on apparatus such as shown and described with respect to FIGS. 1–5. The disc was rotated at 1800 RPM and optical measurements were taken which indicated a stability of the recording surface of at least ±3μ throughout a zone of from 60 mm radius to 115 mm radius. There were limitations as to the optical detection and it is thought the stability may be much better than ±3μ. Thus, as described above, the rotating disc was written upon in several tracks, within a well stabilized zone, by apparatus such as shown in FIG. 1, both with and without an active focus servo system. In another test, a 12-inch diameter disc having a support of 0.004 Estar film base of the type described above (with a ¼" curl) was supported in apparatus as previously described with a height "h" of 0.010 inch and rotated at 1800 RPM. Instead of a recording layer, the disc comprised a smoothing layer on the support and a 1000 Å aluminum layer. The rotating surface was optically measured, within a central annular portion, to be stable in a direction parallel to the axis of rotation to about ±1.5μ. Thus it will be appreciated that this remarkable stabilization aspect of the present invention will allow significant improvement in the writing and reading of optical discs.

In accordance with another significant aspect of our invention, we have found that when a flexible optical disc is stabilized in rotation as described above, an attached protective, flexible disc cover rotating therewith can be aerodynamically stabilized with sufficient precision to allow high-density, high signal-to-noise ratio writing and reading therethrough. This is highly desirable since high density optical disc recording surfaces are generally highly susceptible to damage by scratches, dust, skin oils or other similar contaminants. When a rotating disc cover is elevated at a distance above the recording surface, the dust, debris and scratches on the surface of the cover are outside the depth of focus of the lens focused on the recording layer.

Also, this mode and configuration, utilizing thin, transparent protective layers (with an intervening air gap), considerably simplifies the correction of aberrations induced by focusing (with high or moderately high numerical aperture objectives) compared to a continuous overcoat protective layer, which needs greater thickness to produce a similar protective effect. For example, if disc cover thicknesses less than 0.18 mm are used, ordinary biological microscope objectives that have working distance (the distance from the last lens element to the focus) of 0.5 mm or more can be used. Thick, in situ, protective layers would require special lens designs having very large working distance and cover corrections and such lenses would necessarily sacrifice field of view and/or numerical aperture.

Figure 8:
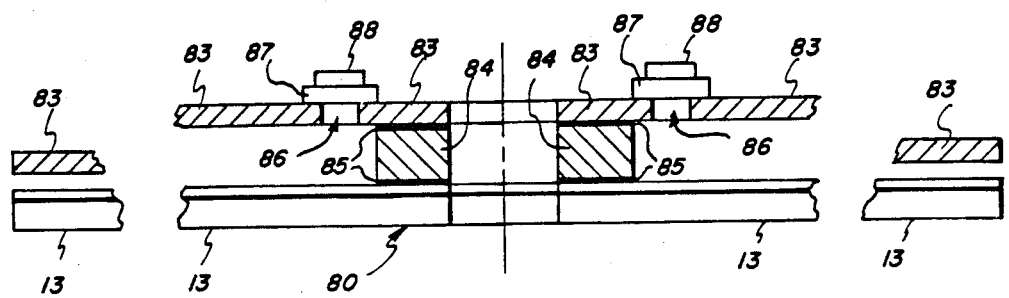
FIG. 8 is a cross-sectional side view, with portions broken away, of one embodiment of flexible optical disc and flexible disc cover according to the present invention.

Referring to FIG. 8, one embodiment of this aspect of the present invention is illustrated. The optical disc 13 can be of the kinds described above and preferably has the characteristics defined for optimal stabilized rotation. Around the periphery of its central aperture, the disc 13 has attached thereto a disc cover 83 which is substantially equal diameter as disc 13. An annular spacer 84 couples the optical disc 13 and disc cover 83 and provides a predetermined central spacing therebetween. The bonds 85 between elements 13, 83 and 84 preferredly are adhesive, although other equivalent bonds could be used. Spaced radially outwardly a small distance from the spacer 84, the disc cover has a plurality of apertures 86 arranged symmetrically around the disc center and equidistant therefrom. Each aperture is covered by a permanent filter element 87 and a removable filter 88 for purposes which will be explained subsequently.

Certain parameters of the disc cover are important. It preferably is flat to less than about ½ inch over a 12" diameter when subjected to the test described-above with respect to the optical disc. The apertures should be formed in the disc cover in a manner avoiding excessive strain or stress. It is preferred to have a thickness in the range from about 1 mil to about 10 mils with a thickness variation in the order of ±2.5μ. The upper limit of the preferred thickness range and the thickness variation tolerance are related to the lens requirements necessary to operate through the disc cover and the lower limit of the preferred thickness range relates to buckling during initial rotation of the unit. Additionally, preferred disc covers are substantially transparent to the write and read wavelength, substantially non-birefringent, substantially homogeneous and free from striae and significant occlusions. One preferred material which provides these characteristics is the solvent-cast, cellulose triacetate support of Eastman Color Negative Film 5247.

Figure 9:
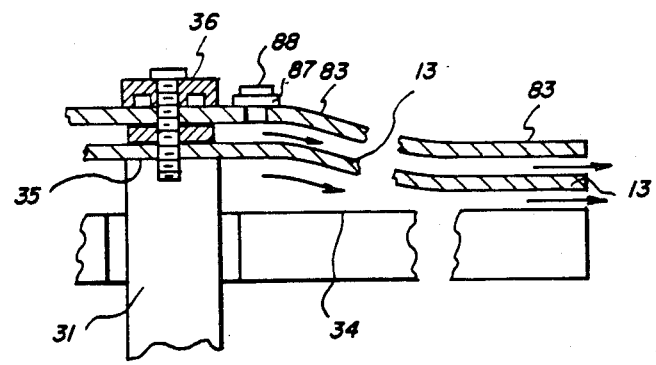
FIG. 9 is a diagrammatic side view like FIG. 7, but showing the operative relation of the FIG. 8 element.

Referring to FIG. 9, the mode of operation of the FIG. 8 disc-disc cover unit 80 will be described. The unit 80 is mounted as described above with respect to FIGS. 2-7 with the optical disc precisely positioned relative to the reference surface. Upon rotation, the optical disc 13 is stabilized as described by its dynamic and elastic forces and the fluid forces effected by air flow between disc 13 and the reference surface 34. Disc cover 83 experiences similar dynamic and elastic forces, and the air between disc 13 and cover sheet 83 spirals outwardly to create a pressure gradient on its upper surface. Remarkably, the disc 13 is so well stabilized with respect to reference surface 34, that it, in turn, provides a reference surface which stabilizes disc cover 83 within good operable limits. We have found that the neutral axis of a disc cover constructed and mounted as described above can easily be stabilized to within about ±6 mils.

The position of the disc cover between the lens and the recording surface does not affect the focused write or read spot except insofar as it allows scratches or debris on its surface to interfere with that spot. The preferred minimum operative spacing between disc 13 and disc cover 83 thus will depend on the numerical aperture of the lens utilized, the thickness of the disc cover and the desired degree of protection from dirt and scratches on the external cover surface. For a cover sheet having a refractive index of n=1.5, the table set forth below illustrates useful minimum operative spacings "S" (i.e., between the recording surface and the bottom of the disc cover in the utilized annular portion of the disc) that will provide the same degree of protection from dust, scratches, etc., as does a 1 mm thick, in situ, transparent overcoat of index n=1.5 used with a 0.5 NA lens. The table lists S for various NA lenses and cover sheet thicknesses of 100μ, 133.4μ and 175μ.

| NA | S (100μ) | S (133.4μ) | S (175μ) |
| --- | --- | --- | --- |
| 0.5 | 0.545 mm | 0.5246 mm | 0.4991 mm |
| 0.6 | 0.4085 mm | 0.3891 mm | 0.3648 mm |
| 0.65 | 0.353 mm | 0.3342 mm | 0.3108 mm |

-continued

| NA | S (100μ) | S (133.4μ) | S (175μ) |
| --- | --- | --- | --- |
| 0.7 | 0.3032 mm | 0.2853 mm | 0.2629 mm |
| 0.75 | 0.2578 mm | 0.2408 mm | 0.2196 mm |
| 0.8 | 0.2152 mm | 0.1994 mm | 0.1797 mm |
| 0.85 | 0.1743 mm | 0.1601 mm | 0.1423 mm |
| 0.9 | 0.1332 mm | 0.1211 mm | 0.1059 mm |
| 0.95 | 0.08814 mm | 0.0792 mm | 0.06797 mm |

In view of the "S" values shown in the above table, it will be appreciated by one skilled in the art, normal working distances (the value of S+0.001" to 0.004" for clearance between the top of the cover and the lens) pertain, thus biological objectives can be used.

The nominal height of the cover sheet over the optical disc at its central region (i.e., the thickness of spacer 84) will be greater than the spacings "S" described above and will depend on disc rotational speed, elastic forces in the cover sheet, etc. We have found that between 5 mils and 15 mils is a good generally operable range for the nominal disc cover height.

For example, a preferred minimum operative spacing (between the recording surface and the bottom of the disc cover in the utilized annulus) for the 300 mm diameter, 0.004 Estar support, optical disc described in the specific example above, is 6 mils, when a 0.65 numerical aperture lens and a 5.25 mils disc cover made of the acetate support described above are used. For rotational speeds of about 1800 RPM, a spacer 84 of about 10 mils provides such an operative 6-mil spacing. A disc-disc cover unit such as just described was rotated at 1800 RPM and recorded and read back by apparatus such as described with respect to FIGS. 1 and 3 (objective 0.65 N.A.). When so written and read, the disc-disc cover unit performed as well as the disc example above, tested without the cover sheet. That is, a signal-to-noise ratio in excess of 50 db was obtained.

The filter elements 87 and 88 are for removing particles from the air passing into the zone between the disc cover 83 and the recording layer surface of disc 13 and subsequently obscuring the recorded information or contaminating the recording surface. We have found it preferred to use removable pre-filters 88, e.g., a Millipore pre-filter (manufacturer's identification number AP 2009000) in conjunction with permanent filter 87, e.g., Millipore 0.2μ (manufacturer's identification number FGLP 09025) or 0.5μ (manufacturer's identification number FHLP 0925) filters, so that the pre-filter can be periodically replaced to allow good air flow. The pre-filters 88 preferably have a pull-away adhesive bond to peripheral portions of permanent filters 87. Such filters can be used with good results and are expected to provide a long-lived arrangement because the airflow therethrough is small, e.g., on the order of 5 ml/min.

It will be noted that the configuration shown in FIGS. 8 and 9 provides another advantageous aspect of the present invention. Specifically, by allowing air flow to ingress between the disc and disc cover through filtered openings in the disc cover (rather than in the disc 13), two advantages pertain. First, the surface of disc 13 is maintained featureless, both on its side facing reference surface 34 and on its side facing the disc cover 83. Second, upon removal and storage the recording surface of disc 13 remains protected from atmospheric particles.

The invention has been described in detail with particular reference to certain preferred embodiments thereof, but it will be understood that variations and modifications can be effected within the spirit and scope of the invention.

What is claimed is:

1. A method of optically writing and/or reading high-density information, said method comprising:
   (1) positioning an optical disc unit, including (i) a flexible record disc which is generally flat, of generally uniform thickness, with an annular record zone on one surface, and (ii) a flexible cover disc that has: (a) an annular portion, which is generally flat and generally uniform in thickness, and in spaced, opposing relation to said record zone, and (b) a central portion that is secured in a fixed, parallel relation with respect to a corresponding central portion of said record disc, with the planes of said central portions in planes substantially normal to an axis of rotation and with the other surface of said record disc closely adjacent a highly smooth, featureless stabilizing reference surface that is axially symmetric to said axis of rotation and generally non-convex to said normal planes;
   (2) maintaining said reference surface stationary and said central disc portions in said plane while rotating said disc unit about said axis at a high speed which flies said other surface of said record disc in closely spaced opposing relation to said stabilizing reference surface and flies said cover disc annular portion in spaced relation to the annular record zone of said record disc;
   (3) coupling a radially central region of: (i) the space between said record disc and said stabilizing reference surface and (ii) the space between the record disc and the cover disc, to gas sources of pressure not substantially exceeding the ambient pressure external of said zone; and
   (4) directing a beam of light for writing and/or reading information on said disc through said rotating cover disc and into precise focus on said rotating record disc.

2. A method of optically writing high-density information, said method comprising:
   (1) positioning an optical disc unit, including: (i) a record disc comprising an annular record zone on one surface of a flexible support which is substantially flat and of substantially uniform thickness and (ii) a transparent flexible, disc cover that has: (a) an annular portion which is generally flat, of generally uniform thickness and in spaced opposing relation to said record zone and (b) a central portion that is secured in a fixed, parallel relation with respect to a corresponding central portion of said record disc, with the planes of said central portions in planes substantially normal to an axis of rotation and with the other surface of said record disc closely adjacent a highly smooth, featureless stabilizing reference surface that is axially symmetric to said axis of rotation and generally non-convex to said normal plane;
   (2) maintaining said reference surface stationary and said central portions in said planes while rotating said disc unit about said axis at a high speed which flies said other surface of said record disc in closely spaced opposing relation to said stabilizing reference surface and flies said cover disc annular portion in spaced relation to the annular record zone of said record disc;
   (3) coupling a radially central region of: (i) the space between said record disc and said stabilizing reference surface and (ii) the space between said record disc and the cover disc, to gas sources of pressure not substantially exceeding the ambient pressure external of said zone; and
   (4) directing a beam of radiation through said rotating cover disc and into precise focus on said record layer and modulating said beam to write information on said record zone.

3. An improved optical disc unit adpated for the optical writing and/or reading of high-density information, said unit comprising:
   (1) a flexible record disc, adapted for precise rotational stabilization, and comprising an annular record zone formed on a flexible support which is substantially flat and of substantially uniform thickness and has a smooth substantially cylindrical peripheral surface;
   (2) a flexible cover disc that has: (a) an annular portion, in spaced, opposing relation to the record zone of said record disc, which is optically transparent to the writing and/or reading light wavelengths, and (b) a central region that is secured, relative to a central region of said record disc, in a fixed, parallel relation; and
   (3) means for coupling a radially interior region(s) between said record disc and said cover disc to air external of said region(s).

4. An improved optical disc unit adpated for the optical writing and/or reading of high-density information, said unit comprising:
   (1) a record disc comprising an annular record zone formed on a flexible disc support which is generally flat and of generally uniform thickness; and
   (2) a flexible cover disc that has an annular portion opposite said record zone and a central region that is secured to a central region of said record disc in a fixed parallel and predeterminedly spaced relation;
   (3) means for predeterminedly spacing said annular zone and portion during disc unit rotation; and
   (4) means for coupling a radially interior region(s) between said record disc and said cover disc to air external of said regions.

5. Apparatus for optically writing and/or reading high-density information, said apparatus comprising:
   (a) an optical disc unit including (1) a flexible record disc, adapted for precise rotational stabilization, and comprising a record zone formed on a flexible support which is generally flat and of generally uniform thickness; (2) a flexible cover disc which has: (i) an annular portion opposite said record zone, and (ii) a central portion that is secured to a corresponding central portion of said record disc in a fixed, parallel relation; (3) means for establishing a spaced relation between said record zone and said annular cover portion; and (4) means for coupling a radially interior region(s) between said record disc and said cover disc to air external of said region(s);
   (b) rotatable means for positioning such optical disc unit in centered relation to a rotational axis and with said central portions of said record disc and cover disc in a plane precisely normal to the rotational axis;
   (c) stationary means defining a highly smooth, featureless, stabilizing reference surface that is axially symmetric to said rotational axis and non-convex to said normal plane;
(d) means for rotating said rotatable means at a high speed which flies said record disc outer portion in closely spaced relation to said reference surface and flies the outer portion of said cover disc in spaced relation to the opposing portion of said record disc;
(e) means for coupling a radially interior region(s) between said stabilizing reference and said record disc to a gas source not substantially exceeding the ambient pressure external of said region(s); and
(f) means for directing a beam(s) of radiation for writing and/or reading through said cover disc and into precise focus on said record zone.

* * * * *